(12) United States Patent
Agarwal et al.

(10) Patent No.: US 8,798,064 B2
(45) Date of Patent: Aug. 5, 2014

(54) METHOD AND SYSTEM OF FRAME FORWARDING WITH LINK AGGREGATION IN DISTRIBUTED ETHERNET BRIDGES

(75) Inventors: Puneet Agarwal, Cupertino, CA (US); Niranjan Vaidya, Santa Clara, CA (US); Biju Babu, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 144 days.

(21) Appl. No.: 13/337,774

(22) Filed: Dec. 27, 2011

(65) Prior Publication Data
US 2012/0307828 A1    Dec. 6, 2012

Related U.S. Application Data

(60) Provisional application No. 61/493,896, filed on Jun. 6, 2011.

(51) Int. Cl.
*H04L 12/28*    (2006.01)
(52) U.S. Cl.
USPC .......................................... 370/392; 370/401
(58) Field of Classification Search
None
See application file for complete search history.

(56) References Cited

U.S. PATENT DOCUMENTS

| | | | |
|---|---|---|---|
| 2006/0274647 A1* | 12/2006 | Wang et al. | 370/216 |
| 2008/0068985 A1* | 3/2008 | Mieno | 370/217 |
| 2010/0054117 A1 | 3/2010 | Southworth et al. | |
| 2012/0230182 A1* | 9/2012 | Southworth et al. | 370/217 |

OTHER PUBLICATIONS

Recio, R., et al., "Ethernet Virtual Bridging Automation Use Cases," 22nd International Teletraffic Congress, Sep. 7, 2009, XP-002684764, 10 Pages.*
"IEEE 802 Tutorial: Edge Virtual Bridging; evb-tutorial-draft-20091116..y09," IEEE Darft; EVB-Tutorial-Draft-20091116 .v09, IEEE-SA 802(v09), Nov. 17, 2009, XPO17655201, 54 Pages.*
Recio, R., et al., "Ethernet Virtual Bridging Automation Use Cases," $22^{nd}$ International Teletraffic Congress, Sep. 7, 2009, XP-002684764, 10 Pages.
"IEEE 802 Tutorial: Edge Virtual Bridging; evb-tutorial-draft-20091116v09," IEEE Darft; EVB-Tutorial-Draft-20091116v09, IEEE-SA 802(v09), Nov. 17, 2009, XPO17655201, 54 Pages.
European Search Report dated Oct. 19, 2012, for European Patent No. EP 12 00 3921, European Patent Office, Netherlands.
Office Action for related Taiwanese Patent Application No. 101120312, mailed Mar. 24, 2014; 10 pages.

* cited by examiner

*Primary Examiner* — Chi Pham
*Assistant Examiner* — Fahmida Chowdhury
(74) *Attorney, Agent, or Firm* — Sterne, Kessler, Goldstein & Fox PLLC (57) ABSTRACT

Embodiments relate to forwarding of packets in link aggregation environments. A method for forwarding a packet through an extended switch including a first port extender and a second port extender directly or indirectly communicatively coupled to respectively a first interface and a second interface of a controlling bridge includes, associating a first port extender interface of the first port extender with a global namespace or an interface-specific namespace. The method further includes receiving a packet through the first port extender interface, marking the received packet with an indication of the namespace configuration of the first port extender interface, processing the marked packet in the controlling bridge based at least in part upon the indication, and transmitting the processed packet out of the controlling bridge.

23 Claims, 9 Drawing Sheets

FIG. 8

METHOD AND SYSTEM OF FRAME FORWARDING WITH LINK AGGREGATION IN DISTRIBUTED ETHERNET BRIDGES

CROSS-REFERENCE TO RELATED APPLICATIONS

The present application claims the benefit of U.S. Provisional Patent Application No. 61/493,896 filed on Jun. 6, 2011, and entitled "Method and System to Support Edge Link Aggregation," which is hereby incorporated in its entirety.

FIELD OF THE INVENTION

Embodiments of this invention are related to supporting link aggregation in networks with extended Ethernet Bridges.

BACKGROUND

Background

In many environments such as data centers (or server farms), there is a need to inter-connect and manage a very large number of physical or virtual servers. There are many challenges associated with provisioning the interconnections and managing policies for each server and these are compounded by the growth in virtual server environments.

In a virtualized environment, each physical server implements a hyper visor that manages multiple virtual servers (or virtual machines, VMs). The hypervisor may implement its own network switch so its constituent VMs can communicate with each other. This however, creates a management and performance challenge. The switch within the hypervisor lacks the capabilities of dedicated network switches and is outside the scope of the data center network's management framework.

Dedicated network switches (such as Ethernet bridges, switches and routers) are typically implemented in high performance silicon and it is desirable to extend the benefits of these switches to managing inter-VM traffic.

One model for enabling connectivity in such environments is through the use of a "distributed switch" or "extended switch". As used herein, the distributed switch may also be referred to as a "distributed bridge" or "extended bridge". This model includes a controlling bridge entity (CB) and subordinate port extender entities (PE). The CB entity contains high performance silicon for switching Ethernet packets (frames) and the PE entities provide access ports of the distributed switch with limited packet switching capabilities to and from a CB. Upon the entry of a packet to the distributed switch at a PE port, the PE attaches a "Port Identifier" tag ("port identifier tag") to the packet in order to help identify and process it at the CB. This port identifier tag identifies the ingress interface of the packet to the distributed switch. A PE may be connected to multiple CBs and the port identifier tag attached to the packet must be meaningful to the CB to which the packet will be forwarded. Each PE uplink connects to a unique CB and the CB can be thus identified by the PE's uplink interface. If an identifier namespace is associated with the PE's uplink interface and thus associated to the CB, the port identifier tag must be within the scope of that namespace.

To enable redundancy, Ethernet link aggregation groups (LAGs) may be used anywhere in such a network including any links connecting PEs to Servers/Switches, PEs to PEs, or PEs to CB. A LAG makes multiple Ethernet links appear as a single logical link with load balancing techniques used to distribute traffic on to the individual member links of the LAG. If there is a LAG interconnecting the first layer of PEs (or the so called "access PEs") of the distributed switch to Servers/Switches, and if packets sent through member links of the LAG reach the CB through separate physical interfaces of the CB (and thus different namespaces), then the forwarding of packets based on the port identifier tag may fail in the presence of LAGs, as the port identifier tag identifying a single LAG will get mapped to different namespaces. Therefore, methods and systems are needed for forwarding of packets in distributed switch environments that include LAGs.

BRIEF SUMMARY

Embodiments relate to forwarding of packets in link aggregation environments. A method for forwarding a packet through an extended switch including a first port extender and a second port extender directly or indirectly communicatively coupled to respectively a first interface and a second interface of a controlling bridge includes, associating a first port extender interface of the first port extender with a global namespace or an interface-specific namespace. The method further includes receiving a packet through the first port extender interface, marking the received packet with an indication of the namespace associated with the first port extender interface, processing the marked packet in the controlling bridge based upon the indication, and transmitting the processed packet out of the controlling bridge.

A system for forwarding a packet, includes, a controlling bridge, a first port extender directly or indirectly coupled to a first interface of the controlling bridge, a second port extender directly or indirectly coupled to a second interface of the controlling bridge, an interface configuration module, a packet receiving module configured to receive a packet through the first port extender interface, a packet namespace marking module configured to mark the packet with an indication of the associated namespace of the first port extender interface, and a packet processing module configured to process the marked packet in the controlling bridge based at least in part upon the indication. The interface configuration module is configured to associate a namespace configuration of a first port extender interface of the first port extender with a global namespace or an interface-specific namespace.

A computer readable storage media storing instructions wherein said instructions, when executed by a processor, are adapted to perform packet forwarding through an extended switch wherein the extended switch includes a first port extender and a second port extender directly or indirectly communicatively coupled to respectively a first interface and a second interface of a controlling bridge. The packet forwarding is performed with a method including associating a first port extender interface of the first port extender with a global namespace or an interface-specific namespace, receiving a packet through the first port extender interface, marking the received packet with an indication of the namespace configuration of the first port extender interface, processing the marked packet in the controlling bridge based at least in part upon the indication, and transmitting the processed packet out of the controlling bridge.

BRIEF DESCRIPTION OF THE DRAWINGS/FIGURES

Reference will be made to the embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments.

DETAILED DESCRIPTION

While the present disclosure is described herein with reference to illustrative embodiments for particular applications, it should be understood that the disclosure is not limited thereto. Those skilled in the art with access to the teachings herein will recognize additional modifications, applications, and embodiments within the scope thereof and additional fields in which the disclosure would be of significant utility.

A currently evolving standard known as IEEE 802.1BR defines a "port extender" solution to inter-connect and manage a very large number of physical or virtual servers an extended switch. Embodiments of the present disclosure may be used with extended switches corresponding to the IEEE 802.1BR standard. However, the "extended switch" or "distributed bridge", as described herein, is not limited to the 802.1BR standard and may be included in other network elements.

A single logical switch (i.e., referred to herein as an extended switch or distributed switch) using port extension technology comprises a controlling switch (herein also referred to as controlling bridge, CB) and one or more port extenders (PE). As used herein, the term "switch" may also include bridging functionality. Each PE is directly or indirectly connected to an interface on the CB, and, in effect, adds a number of interfaces to the CB. For example, if an interface of the CB could connect to only one end station previously, by coupling that interface to a PE that has four downlink interfaces connected to end stations, the CB interface can now connect to up to four end stations. In virtualized environments, each physical interface of the extended switch can be used to connect to a plurality of virtual machine end stations. Although PEs may be configured to perform some forwarding functions, most of the functions are performed at the CB. The functions performed by the CB may include address lookups, learning and aging functions, VLAN functions, and access control list (ACL) processing. The concept of an extended switch comprised of a CB and many PEs, provides many advantages; such as enabling simplified PE devices and centralized control and policy management at the CB.

However, much of the processing in the CB is specific to the inter-face through which the packet entered the CB. This interface-specific processing is based upon an assumption that end station connectivity can be viewed as a "tree" rooted at interfaces of the CB. However, in many environments, including environments in which a virtualized server is connected to an extended switch through a LAG or other aggregated link, the above assumption of end station reachability does not hold. For example, because individual links of a LAG can be coupled to different PEs, an end station or virtual machine may be reachable through two different interfaces, or more specifically via the PEs coupled to the two different interfaces, of the CB. The availability of multiple paths from the CB to an end station can interfere with the interface-specific processing at the CB.

Embodiments of the present disclosure provide methods, systems, and computer program products to enable the forwarding of packets, in environments where multiple paths are present when connecting to an extended switch, such as when link aggregation is in use. In embodiments, a global namespace is associated with PE interfaces connected to a LAG, and packets that enter the extended switch through those PE interfaces are identified so that they can properly be processed (e.g., for learning and forwarding) throughout the extended switch.

Figure 1A:
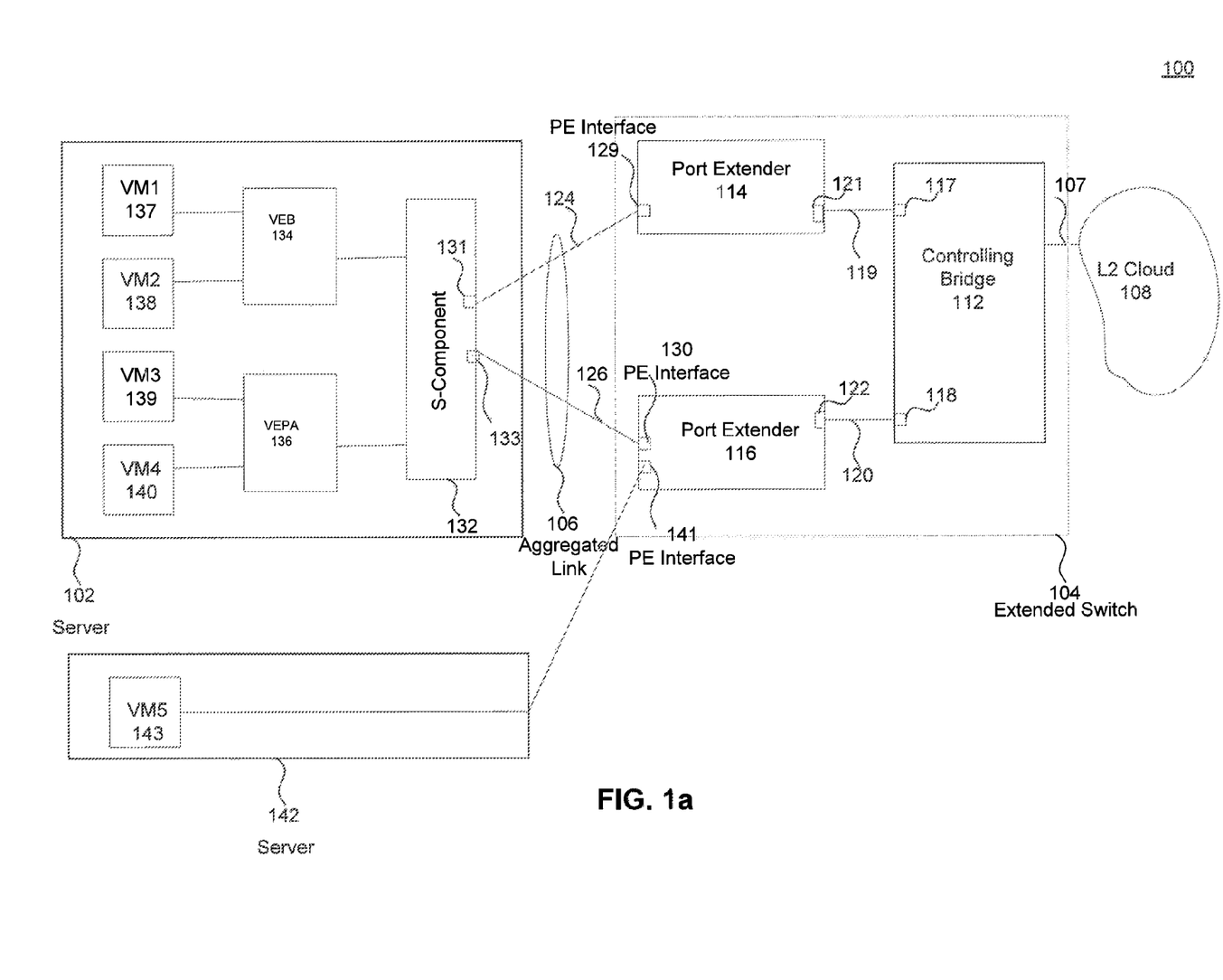
FIG. 1a illustrates a system to support edge link aggregation in an extended switch.

FIG. 1a shows a system 100 for forwarding packets using an extended switch, according to an embodiment of the present disclosure. System 100 includes an extended switch 104 that interconnects a server 102 to a layer 2 cloud (L2 cloud) 108. L2 cloud 108 includes a network of end-stations and/or intermediate platforms (e.g., routers, switches, bridges, and the like) that are reachable from extended switch 104. For example, L2 cloud 108 can include a local area network (LAN) in a data center. The communicative coupling 107 between extended switch 104 and L2 cloud 108 may be based on wired or wireless network technology. According to an embodiment, communication link 107 includes an Ethernet link.

Server 102 may include one or more virtual servers communicatively coupled to extended switch 104. According to the embodiment shown, server 102 includes virtual machines (VM) VM1 137, VM2 138, VM3 139, and VM4 140. Server 102 and respective VMs 137-140 are communicatively coupled to extended switch 104. Each VM 137-140 implements a logical server and includes the capability to transmit and receive packets. Each VM 137-140 implements a virtual network interface card (vNIC, not shown) to which a media access control (MAC) address may be assigned. Other identifiers, such as, but not limited to, virtual LAN (VLAN) identifiers may also be assigned to a vNIC. Each VM sends and receives packets through its respective vNIC. The vNICs are mapped to physical interfaces of server 102. VMs 137-140 may be coupled to extended switch 104 through one or more layers of switching. For example, in the illustrated embodiment, VM1 137 and VM2 138 are coupled to a Virtual Ethernet Bridge (VEB) 134, and VM3 139 and VM4 140 are coupled to a Virtual Ethernet Port Aggregator (VEPA) 136. VEB 134 and VEPA 136 provide or facilitate bridging for VMs, and are described below. A server, such as the illustrated server 102, that implements bridging for VMs using VEB and/or VEPA may also be referred to as a server with edge virtual bridging (EVB). EVB is described, for example, in IEEE 802.1Qbg, which is incorporated herein by reference in its entirety.

VEB 134 may include functionality to support local bridging of packets between multiple VMs 137-138 and also support for the VMs 137-138 to use an external switching platform such as switch 104. VEB 134 may be configured to forward packets between VM1 and VM2 directly without going through the external switching platform.

VEPA 136 enables communication between VM3 139 and VM4 140 via an external switching platform such as switch 104. VEPA 136 sends all traffic from VMs connected to it to the uplink switch. VEB 134 and VEPA 136 may be implemented as parts of the hypervisor (not shown) of virtual server 102.

VEB 134 and VEPA 136 are coupled to extended switch 104 through S-component 132. S-component 132 includes functionality to multiplex/demultiplex traffic from/to VEB 134 and VEPA 136. For example, S-component 132 enables VEB 134 and VEPA 136 to share one aggregated link 106 through which they communicate with the uplink extended switch 104. According to an embodiment, S-component 132 adds a VLAN tag that (known as service VLAN tag) to the packet before forwarding the packet to extended switch 104. The VLAN tag identifies whether the packet is from VEB 134 or VEPA 136. In an embodiment, service VLAN tags are supported and processed at both the S-component 132 and extended switch 104 according to the IEEE 802.1ad protocol. Protocols other than those described above may also be implemented by S-component 132 and extended switch 104 to exchange packets between VMs 137-140 and switch 104.

Aggregated link 106 may include two or more links (e.g., 124 and 126) coupling physical interfaces of server 102 to physical interfaces of extended switch 104. Physical interfaces 131 and 133 of server 102 can be coupled respectively to extended switch physical interfaces 129 and 130. Server 102 may configure interfaces 131 and 133 as interfaces of a LAG. Aggregated link 106 may be implemented at server 102 according to a standardized aggregation protocol such as IEEE Ethernet Link Aggregation (IEEE 802.3ad) or other aggregation protocol. S-component 132 may determine which of the links 124 and 126 of aggregated link 106 is to be used in sending a packet from any one of VM1-VM4 to extended switch 104. Criteria, such as, but not limited to, balancing of the load on links 124 and 126 may be considered when S-component 132 determines on which link a packet should be sent to extended switch 104.

According to the illustrated embodiment, extended switch 104 includes a CB 112 and PEs 114 and 116. An interface 121 on PE 114 is connected through link 119 to an interface 117 on CB 112. An interface 122 on PE 116 is connected through link 120 to an interface 118 on CB 112. As described above, PEs 114 and 116 allow the number of interfaces connecting to the respective interfaces of CB 112 to be increased. In the embodiment illustrated in FIG. 1, link 124 of aggregated link 106 is connected to the interface 129 of PE 114 and link 126 of aggregated link 106 is connected to the interface 130 of PE 116. In some embodiments, PEs 114 and 116 may be indirectly coupled to CB 112 respectively through one or more other PEs. As described above, CB 112 may be configured to perform most of the forwarding and other processing functions for the traffic to/from VMs 137-140. PEs 114 and 116 may be configured to forward packets between VMs 137-140 and CB 112. Because links 124 and 126 of LAG 106 connect to different PEs, VMs 137-140 may be reachable through more than one interface of CB 112.

Figure 1B:
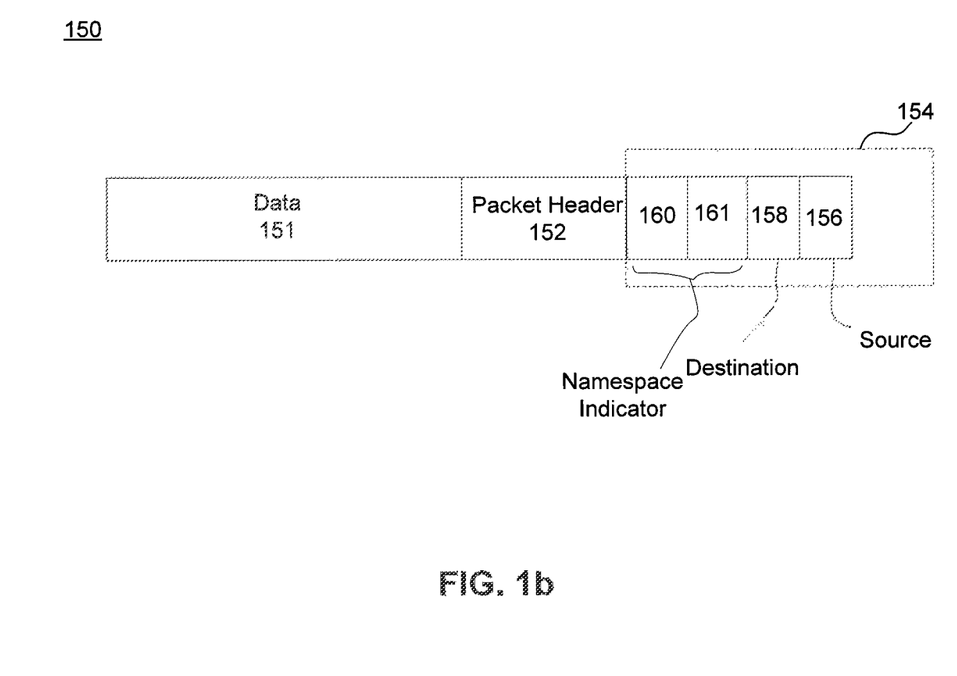
FIG. 1b illustrates a packet for forwarding through an extended switch.

FIG. 1b illustrates the format of a packet 150 that is forwarded through extended switch 104 according to an embodiment. Packet 150 includes user data 151 and a packet header 152. A tag 154 (also referred to as "E-tag") is inserted in packet 150 at PE 114 through which the packet enters extended switch 104. E-tag 154 is removed from packet 150 before the packet exits extended switch 104. E-tag 154 includes fields 158 and 156 to identify a destination and a source, respectively, for the packet. E-tag 154 can optionally include namespace indicator fields 160 and 161 to include an indication of the namespace associated with the source PE interface and destination PE interface of the packet respectively. The source field 156 and destination field 158 are set based on whether packet 150 is ingressing extended switch 104 (i.e., on its way to CB 112 from PE 114) or egressing (i.e., on its way from CB 112 to PEs 114 or 115 to exit extended switch 104). When packet 150 is ingressing, source field 156 is set to identify the interface of PE 114 through which the packet entered extended switch 104. In this example, PE 114 is the source PE interface of the packet. The field values of E-tag 154 are further described below.

Figure 2:
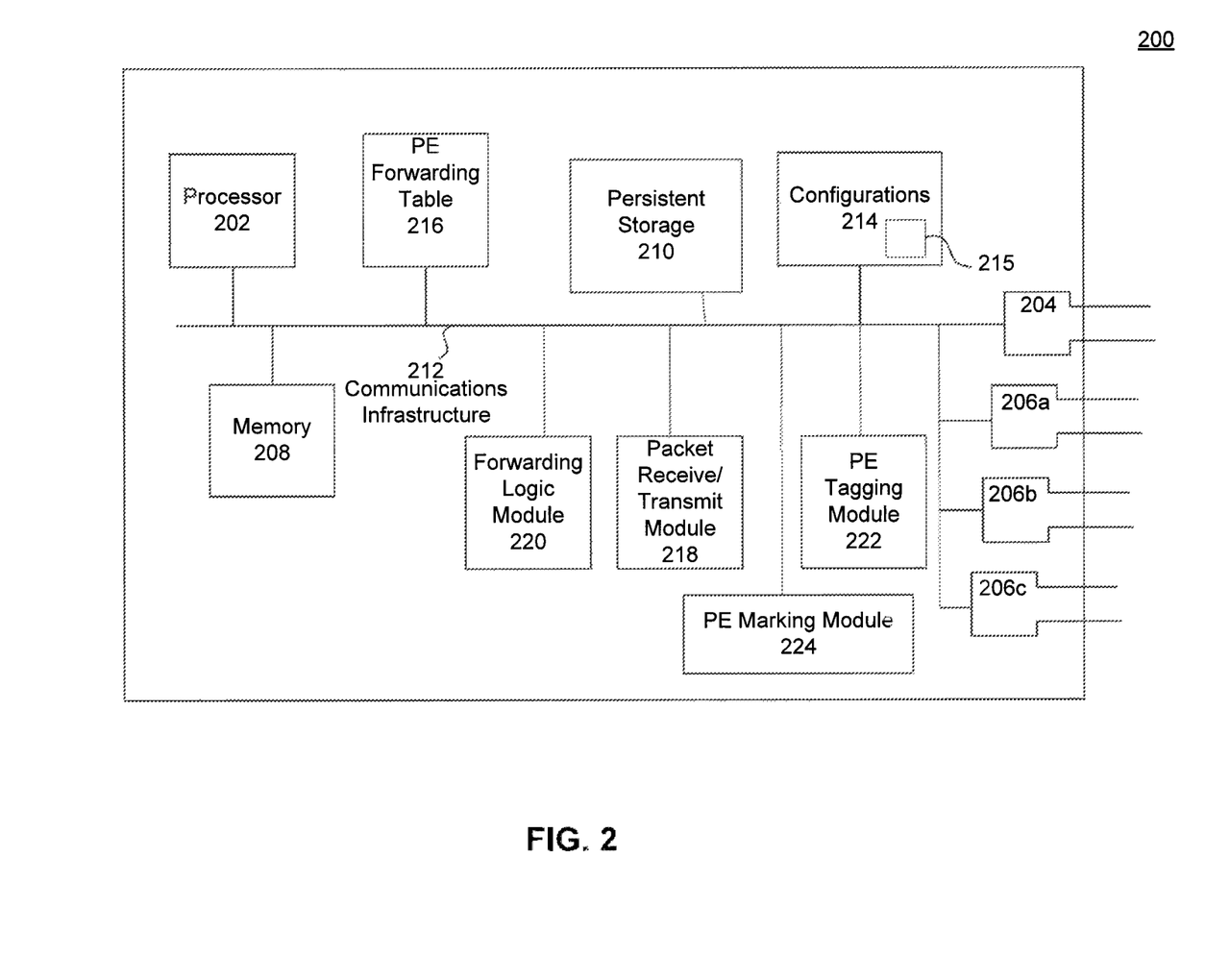
FIG. 2 illustrates a port extender of an extended switch.

FIG. 2 illustrates a PE 200 according to an embodiment of the present disclosure. PE 200 may represent an implementation of PE 114 and/or PE 116. PE 200 comprises a processor 202, an uplink interface 204, one or more downlink interfaces 206a-c, a memory 208, a persistent storage 210, and a communications infrastructure 212.

Processor 202 can include one or more commercially available microprocessors or other processors such as digital signal processors (DSP), application specific integration circuits (ASIC), or field programmable gate arrays (FPGA). Processor 202 executes logic instructions to implement the functionality of or to control the operation of one or more components of PE 200.

Uplink interface 204, and downlink interfaces 206a-c operates to connect PE 200 respectively to an uplink device such as CB 112 or another PE, and to downlink devices such as, for example, server 102. According to an embodiment, uplink interface 204 and downlink interfaces 206a-c include Ethernet interfaces.

Memory 208 includes a type of memory such as static random access memory (SRAM), dynamic random access memory (DRAM), or the like. Memory 208 can be utilized for storing logic instructions that implement the functionality of one or more components of PE 200. Memory 208 can also be used, in embodiments, to maintain configuration information, to maintain buffers (such as queues corresponding to each of the physical interfaces 204 and 206a-c), and to maintain various data structures during the operation of PE 200.

In various embodiments, persistent storage 210 can include a computer readable persistent data storage medium such as magnetic disk, optical disk, flash memory, or the like. Such computer-readable storage mediums can be utilized for storing software programs and/or logic instructions that implement one or more components of PE 200.

Communications infrastructure 212 may include one or more interconnected bus structures or other internal interconnection structure that communicatively couple the various modules of PE 200.

A configuration module 214 includes functionality to configure PE 200. For example, configuration module 214 operates to configure uplink interface 204 to connect to CB 112, and/or to configure one of the downlink interfaces to connect to server 102 through links 124 or 126. Configuration of the PE 200 may be performed by CB 112. Configuration module 214 may also operate to store configurations, and to reconfigure PE 200 upon startup according to the stored configurations or configurations received from CB 112. Configurations 214 can include a namespace configuration parameter 215 which may be configured to represent, for each downlink interface 206a-206c, whether the interface is to be associated with a global namespace or with an interface-specific namespace.

In some embodiments, a PE forwarding table 216 can include forwarding entries 217 to specify which of the downlink interfaces 206a-c can be used to reach respective ones of VMs 137-140. A forwarding logic module 220, according to some embodiments, operates to determine the interface through which a packet that enters the PE is to be forwarded.

A packet receive/transmit module 218 of PE 200 operates to receive packets and to transmit packets.

A PE tagging module 222 operates to attach an E-tag to a packet that enters PE 200. According to an embodiment, a packet 150 is attached with an E-tag 154 to indicate the interface of PE 114 or 115 through which the packet entered extended switch 104 and other information that can be used in forwarding the packet within extended switch 104. According to an embodiment, PE tagging module 222 also operates to remove the E-tag before the packet exits the extended switch, because the E-tag is for internal use within the extended switch.

At the PE (e.g., PE 114) through which a packet from outside (e.g., from server 102) enters extended switch 104, the E-tag's source field 156 is set to the identifier of the interface through which the packet entered the extended switch. For example, when a packet 150 from VM1 137 enters extended switch 104 through interface 129, an E-tag is inserted in the packet at PE 114 and the E-tag's source field 156 is set to represent interface 129 (or, in some embodiments, a virtual interface (not shown) corresponding to VM1 137 at interface 129).

According to an embodiment, each interface of CB 112 that is coupled to a PE is assigned a range of unique addresses. Each interface of a PE is assigned one or more addresses (e.g., a subset of consecutive addresses) from the range of addresses of the interface on the CB 112 to which it is connected. For example, interface 129 of PE 114 is assigned a subset of addresses from the range of addresses assigned to interface 117. Likewise, interface 130 of PE 116 is assigned a subset of addresses from the range of addresses assigned to interface 118. Furthermore, considering the multiple VMs 137-140 that are illustrated in FIG. 1a, multiple sub-interfaces are configured at interface 129 for each VM that can send packets to the first PE 114. Each sub interface of interface 129 can be assigned an address from the subset of addresses assigned to interface 129. Interface 130 of PE 116 is configured in a similar manner.

According to an embodiment, the range of addresses assigned to an interface of CB 112 may be divided to two non-overlapping ranges: an interface-specific address range and a global address range. Addresses from the former are used to indicate the interface-specific namespace, and addresses from the latter are used to indicate the global namespace. According to another embodiment, separate ranges of addresses for the interface-specific namespace and for the global namespace may be assigned to each of the downlink interfaces of CB 112.

A PE marking module 224 operates to mark an incoming packet with an indication of the namespace with which the source PE interface of the packet is associated. The namespace associated with the source PE interface indicates a context in which the addresses (i.e., field values) of the E-tag are to be interpreted during processing in extended switch 104.

According to an embodiment, if it is marked that the source field 156 is associated with an interface-specific namespace, the addresses in the E-tag of the packet are interpreted in a context specific to the interface through which the packet enters the CB. For example, in the embodiment shown in FIG. 1a, a packet that enters through PE 114 would enter CB 112 through interface 117, and if source field 156 is associated with an interface-specific namespace, the addresses in the E-tag would be interpreted in a context that is specific to interface 117. If source field 156 is marked as being associated with the global namespace, then the addresses in the E-tag are interpreted globally, i.e. packets are interpreted without regard to any interface-specific context.

The marking of the packet at the PE may be performed by selecting addresses for the E-tag fields from the global address range or the interface-specific address range based upon the namespace to be used.

According to another embodiment, the marking is performed by inserting a predetermined value in an optional namespace field 160 in E-tag 154 of packet 150. For example, a protocol between the PEs 114, 116 and CB 112 may be configured to include an E-tag 154 having fields 160 and 161 which are used to indicate the namespaces associated with the source field. According to another embodiment, one or more fields to indicate the namespace of the packet may be separated from the E-tag. The PEs and CBs are configured to be able to identify the location of the field in the packet that corresponds to the source namespace of the packet and to interpret the values in the field to determine the namespace being used.

Figure 3:
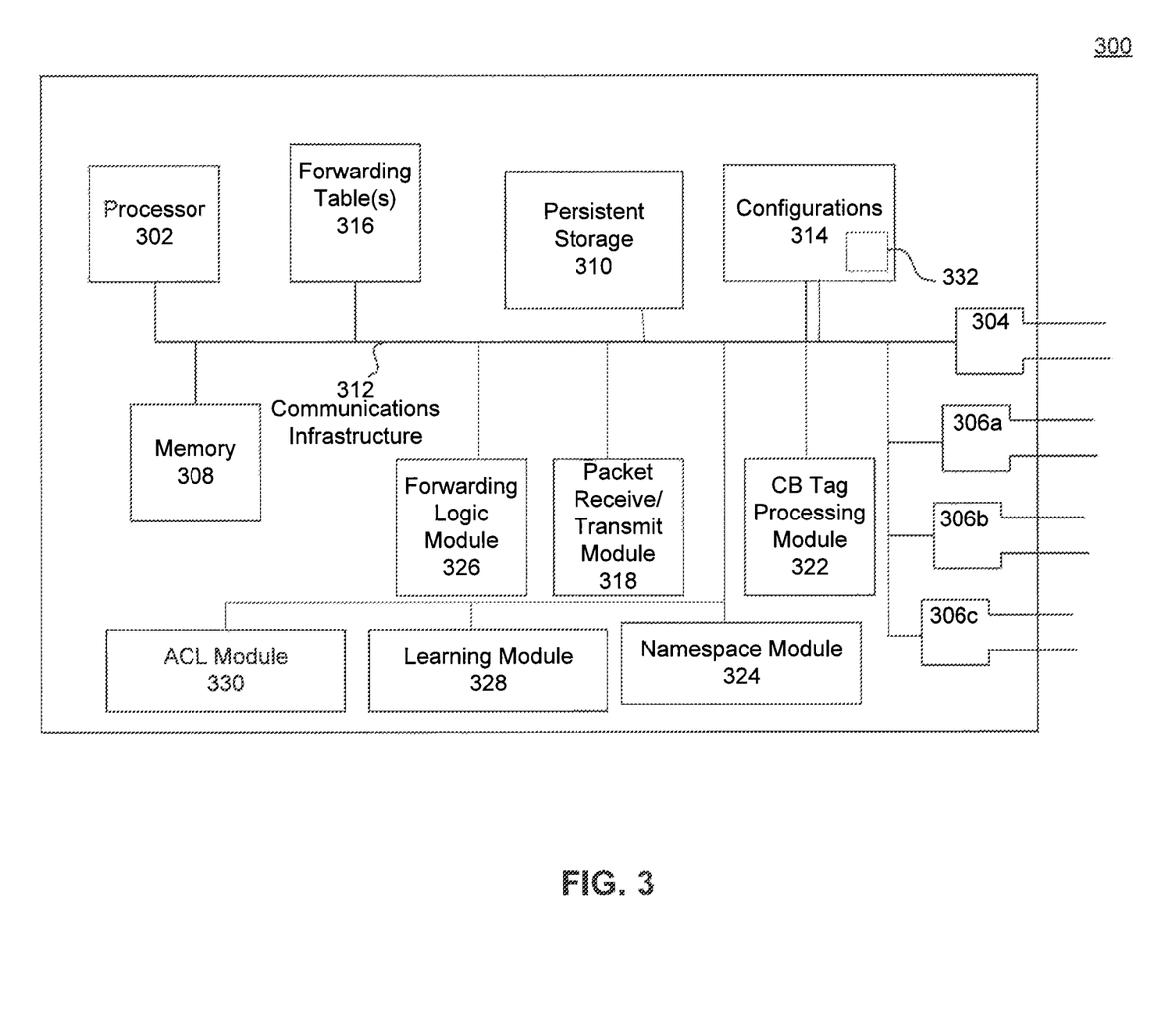
FIG. 3 illustrates a controlling bridge of an extended switch.

FIG. 3 illustrates a CB 300, according to an embodiment of the present disclosure. CB 300 may represent an implementation of CB 112 according to an embodiment. CB 300 comprises a processor 302, an uplink interface 304, one or more downlink interfaces 306a-c, a memory 308, a persistent storage 310, and a communications infrastructure 312.

Processor 302 can include one or more commercially available microprocessors or other processors such as digital signal processors (DSP), application specific integration circuits (ASIC), or field programmable gate arrays (FPGA). Processor 302 executes logic instructions to implement the functionality of or to control the operation of one or more components of CB 300.

Uplink interface 304, and downlink interfaces 306a-c operate to connect the CB respectively to an L2 network such as L2 cloud 108, and to downlink devices such as, for example, PEs or end stations. According to an embodiment, uplink interface 304 and downlink interfaces 306a-c include Ethernet interfaces.

Memory 308 includes a type of memory such as static random access memory (SRAM), dynamic random access memory (DRAM), or the like. Memory 308 can be utilized for storing logic instructions that implement the functionality of one or more components of CB 300. Memory 308 can also be used, in embodiments, to maintain configuration information, to maintain buffers (such as queues corresponding to each of the physical interfaces 304 and 306a-c), and to maintain various data structures during the operation of CB 300.

In various embodiments, persistent storage 310 can include a computer readable persistent data storage medium such as magnetic disk, optical disk, flash memory, or the like. Such computer-readable storage mediums can be utilized for storing software programs and/or logic instructions that implement the functionality of one or more components of CB 300.

Communications infrastructure 312 may include one or more interconnected bus structures or other internal interconnection structure that communicatively couple the various modules of CB 300.

A configuration module 314 of CB 300 operates to configure CB 300 and any PE that is directly or indirectly connected to CB 300. For example, configuration module 314 can operate to configure uplink interface 304 to connect to an L2 cloud, and for two of the downlink interfaces to connect respectively to PEs 114 and 116. Configuration module 314 may also store configurations and configure CB 300 and connected PEs upon startup according to the stored configurations.

The configurations stored and/or otherwise available in CB 300 may include namespace configurations 332. According to an embodiment, each interface of the CB includes its own namespace by default and a global namespace. Each namespace may be identified by a range of unique addresses. The addresses can be automatically generated or manually assigned. Each namespace may also include a specification (determined by, for example, configuration) of what interfaces are assigned to that namespace. For example, a global namespace may be defined to include interface 129 of PE 114 and interface 130 of PE 116.

In some embodiments, a CB forwarding table 316 may include forwarding entries to, for example, determine which destinations are reachable through its downlink interfaces 306a-c, and which destinations are to be sent out of uplink interface 304. A forwarding logic module 326 operates to determine the CB interface through which an outgoing packet is to be transmitted, and the PE interface(s) through which that packet is ultimately transmitted out of the extended switch 104.

A packet receive/transmit module 318 of CB 300 operates to receive packets and to transmit packets.

A CB tag processing module 322 operates to process E-tags of the incoming packets and to configure E-tags of the packets outgoing from the CB. According to an embodiment, CB tag processing module 322 processes E-tag 154 that is attached to a packet 150 at the PE (e.g. 114 or 116) through which the packet enters the extended switch 104. The processing of E-tag 154 at CB 112 includes determining through which interface (e.g., 117 or 118) the packet entered CB 112. Upon having completed other processing of the packet, such as the processing of the packet header, the incoming E-tag is replaced with a new E-tag or the incoming E-tag is modified before the packet is transmitted out of the CB towards its destination. The destination field 158 of outgoing packet 150 is set according to the destination identified in the forwarding lookup. For example, the E-tag destination field 158 can be set to an address of an interface on PE 116 through which the packet is to egress extended switch 104 towards its destination. The destination field added shall be properly identified as belonging to interface-specific namespace or global namespace using field 161.

A namespace module 324 operates to determine the namespace associated with a packet. For example, namespace module 324 may determine if a packet 150 that entered CB 112 from a PE 114 or 116 should be processed based upon interface-specific namespace or based upon the global namespace. The determination of the namespace for a packet may be based upon determining whether the packet includes an indication of its source namespace, for example, in the E-tag of the packet. According to an embodiment, if the packet does not include an indication of its source namespace, then its namespace is associated with the interface-specific namespace of the interface through which it entered the CB.

A learning module 328 operates to automatically learn the reachability of end-stations. According to an embodiment, the reachability of end-stations may be learned by CB 112 based upon data packets forwarded through CB 112. For example, CB 112 may determine that the source of a packet 150 is reachable through the PE interface through which the packet entered the extended switch. When the source of a packet is reachable through multiple PE interfaces, such as when individual links 124 and 126 of LAG 106 are coupled to different PEs of extended switch 104, there can be reachability to any one of sources VM1 137-VM4 140 via multiple interfaces of CB 112. A load balancing technique may be used to select a preferred path to a node when there is more than one available path. According to an embodiment, learning of node reachability is performed in the context of the respective namespaces. For example, if a packet 150 is marked to indicate the global namespace, then the source of that packet is likely to be reachable via multiple interfaces of CB 112.

An access control list (ACL) module 330 operates to perform filtering of packets before and/or after forwarding processing. According to an embodiment, the ACL processing may be performed in the context of the respective namespaces. For example, ACL entries may be looked up based upon the CB interface through which the packet entered the CB or the interface through which the packet is to exit the CB.

Figure 4:
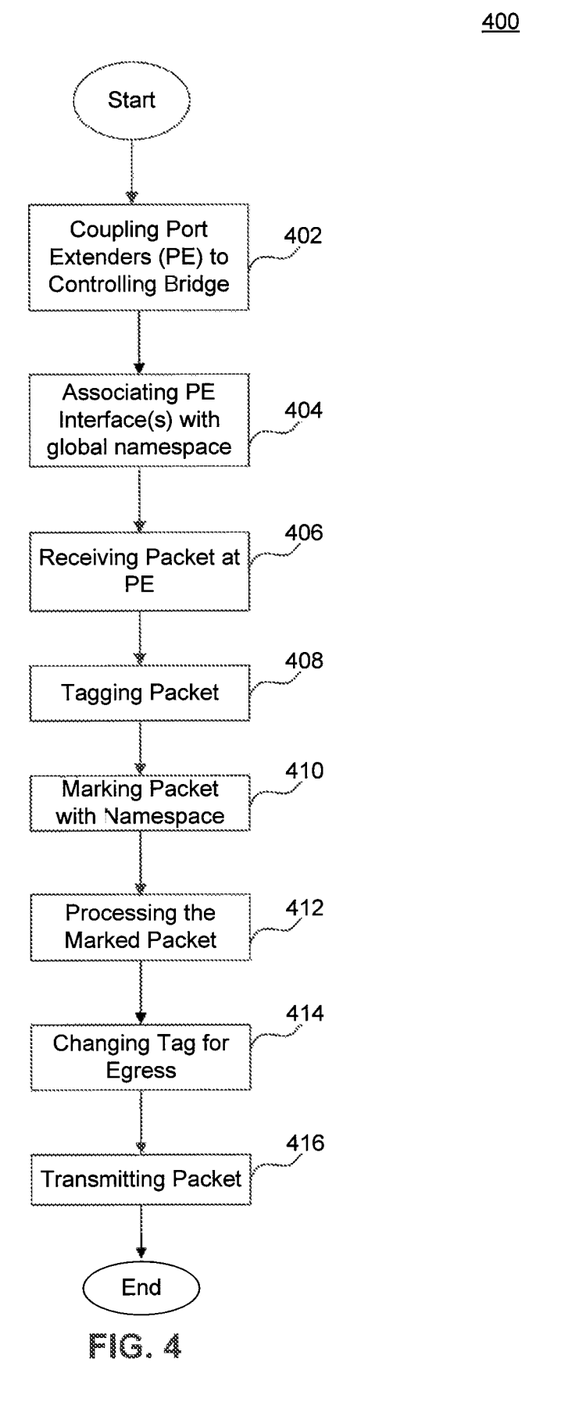
FIG. 4 illustrates a flowchart of a method to support edge link aggregation in an extended switch.

FIG. 4 illustrates a flowchart of a method 400 (steps 402-416) for forwarding packets, according to an embodiment of the present disclosure. Method 400 may be implemented in a system such as the system 100 illustrated in FIG. 1.

In step 402, an extended switch is configured by coupling two or more port extenders to a CB. For example, CB 112 may be configured to couple to PE 114 and PE 116 to form extended switch 104. Extended switch 104 may be coupled to server 102 and L2 cloud 108 as shown in FIG. 1.

In step 404, one or more interfaces of PEs of the extended switch are associated with a global namespace. For example, interface 129 of PE 114 and interface 130 of PE 116 of extended switch 104 are configured as being associated with a global namespace. Interfaces 129 and 130 are selected to be configured to be associated with the global namespace because they are coupled to server 102 via links 124 and 126, respectively, which belong to the same LAG 106.

Processing of packets, including source pruning and hair pining, in an extended switch using interface-specific namespaces is based on the assumption that node reachability takes the form of a tree rooted at the interfaces of the CB. However, when an LAG such as LAG 106 is configured, the assumption that node reachability takes the form of respective trees rooted at the interfaces of the CB is incorrect. For example, LAG. 106, in which individual links are coupled to different PEs of an extended switch, can result in there being reachability to nodes (e.g., VM1 137-VM4 140) via multiple interfaces of the CB of an extended switch.

In step 406, a packet to be forwarded is received at the extended switch from an end station. For example, a packet may be received at PE 114 of extended switch 104 from server 102. The packet may have as source and destination, YM1 137 and VM4 140, respectively.

In step 408, an E-tag, such as E-tag 154, is attached to the packet. As described above the E-tag is for use within the extended switch. The E-tag includes a source field 156 and destination field 158. Source field 156 of the incoming packet is set to identify the interface through which the packet entered the extended switch.

In step 410, the packet is marked to indicate that it entered the extended switch through an interface which has been configured to be associated with a global namespace. According to an embodiment, a namespace field in an F-tag is used for the indication of the namespace of the source field of the packet. The namespace field in the F-tag can be, for example, set to a "1" if the source PE interface is associated with the global namespace. The namespace field can remain at its initialized value of "0" otherwise. The marked packet is then sent to the CB of the extended switch.

In step 412, the marked packet is processed in the CB based upon the global namespace as indicated in the packet, to determine a next hop to which the packet is to be forwarded from the extended switch. The processing of the marked packet based upon the global namespace yields a next hop to which the packet is to be forwarded from the extended switch. The processing also results in determining the interface of the extended switch through which the packet is set to egress.

The path from the CB to the interface through which the packet is to egress the extended switch may include one or more PEs. In step 414, the E-tag is updated with information necessary for the packet to be forwarded through the one or more PEs to egress the extended switch. The update of the E-tag is performed differently depending upon the forwarding requirements.

If the packet is to be forwarded out of an uplink interface of the CB (e.g., egress on link 107 in CB 112), then the E-tag is removed and the packet is forwarded to the L2 cloud.

If the packet is to be forwarded over a downlink interface of the CB, then the E-tag of the packet is appropriately updated, as described below, to be forwarded from the CB through the one or more PEs. The E-tag is updated differently based upon whether the incoming and outgoing namespaces of the packet are the same or different. The incoming namespace of the packet, as described, can be determined based upon the address used in the incoming E-tag destination field or based on the namespace indication field of the packet. The outgoing namespace is determined based upon the destination and the forwarding lookup. The namespace of the outgoing packet is based upon the PE interface through which the packet is to exit extended switch 104 (i.e., whether that PE interface is configured as a global interface) and the interface through which the outgoing packet is to exit the CB.

If the packet's incoming and outgoing namespaces are different, then the E-tag's source field is updated to a value of 0 and the E-tag's destination field is updated according to the destination. For example, if a packet arrived at CB 112 from VM1 137 via PE 114 and CB interface 117, it would be associated with the global namespace since interface 129 at PE 114 is part of a LAG. If that packet, according to the forwarding lookup at CB 112, is to be transmitted through CB interface 118 to PE 116 to destination VM5 143 on another server 142 via PE interface 141, then the E-tag's source field is set to 0 and E-tag's destination field is set to a value associated with interface 141.

If the packet's incoming and outgoing namespaces are the same, then the E-tag's source field remains unchanged. The outgoing E-tag's destination field is updated according to the destination. For example, if a packet arrived from VM1 137 over PE 114 and CB interface 117, it would be associated with the global namespace since interface 129 at PE 114 is part of a LAG. If that packet, according to the forwarding lookup at CB 112, is to be transmitted back through interface 117 to PE 114 towards VM4 140, then the outgoing E-tag's destination field is set to a value representing VM4 140 at interface 129.

If the packet is a multicast packet, it must be forwarded to all receivers of the multicast group. The extended bridge must suitably replicate the packet to ensure that each receiver gets one and only one copy. The E-Tag's destination field identifies a multicast distribution tree for multicast packets and not a specific destination interface. In the absence of LAGs, the multicast distribution can be viewed as a tree rooted at the CB. It is straightforward to replicate the packet at the CB or at various intermediate nodes (PEs) in the tree. Each CB and PE maps the destination multicast tree ID to a list of destination interfaces. Comparing the source field in the E-tag to a destination interface allows a CB or PE to prune away the source and ensure that the source does not receive a copy of its own packet. However, when LAGs are present in the path from the CB to an end host, there are multiple paths through the extended switch to reach a destination. If each node in the extended switch simply forwarded the packet based on mapping the multicast tree ID to a list of destination interfaces, a receiver (such as VM4) would get multiple copies of the same packet. The extended switch must therefore implement a suitable filtering scheme to ensure that each receiver only gets one copy of the packet. One such method is to implement the filtering on a flow basis. Each node computes a hash for a packet. If the destination interface is marked as a member of a LAG, then only flows whose hash matches a mask are allowed to pass. The masks are configured in a mutually exclusive manner at the different nodes ensuring that only one copy of the packet makes its way to the destination. For example, in FIG. 1, consider a multicast packet sourced by VM1. The CB 112 will replicate it to interfaces 117 and 118 with separate copies reaching PEs 114 and 116. PEs 114 and 116 must now be configured to act in a mutually exclusive manner since interfaces 129 and 130 are part of a LAG. Some flows will be filtered by PE 114, others by PE 116 to ensure only one copy reaches each destination. To ensure proper pruning, interfaces that may connect LAG'd paths to the CB must use the global namespace. For example, PE interface 129 and 130 must use a global namespace. PE interface 141 at PE 116 may use an interface specific namespace since it does not connect a LAG to the CB.

In step 416, the outgoing packet is transmitted out of the CB. For example, the packet may be transmitted out of CB 112 interface 118 to PE 116 to egress extended switch 104 out of PE interface 130. As described above, in some embodiments, there may be one or more PEs between a CB interface 118 and PE 116 through which the packet is determined to egress the extended switch. The packet is transmitted by the one or more PEs based upon the E-tag (as updated in the CB) to the interface (e.g., PE interface 130) at PE 116 through which it is to egress the extended switch. At PE 116, the E-tag is removed and the packet is forwarded to server 102 through interface 130.

In the PE through which the outgoing packet exits the extended switch, a pruning technique may be implemented to ensure that a packet is not forwarded back to the same endhost. For example, pruning logic may be implemented in PE 114 to ensure that a multicast packet resulting from a packet received from VM1 137 is not sent back to VM1 137.

Figure 5:
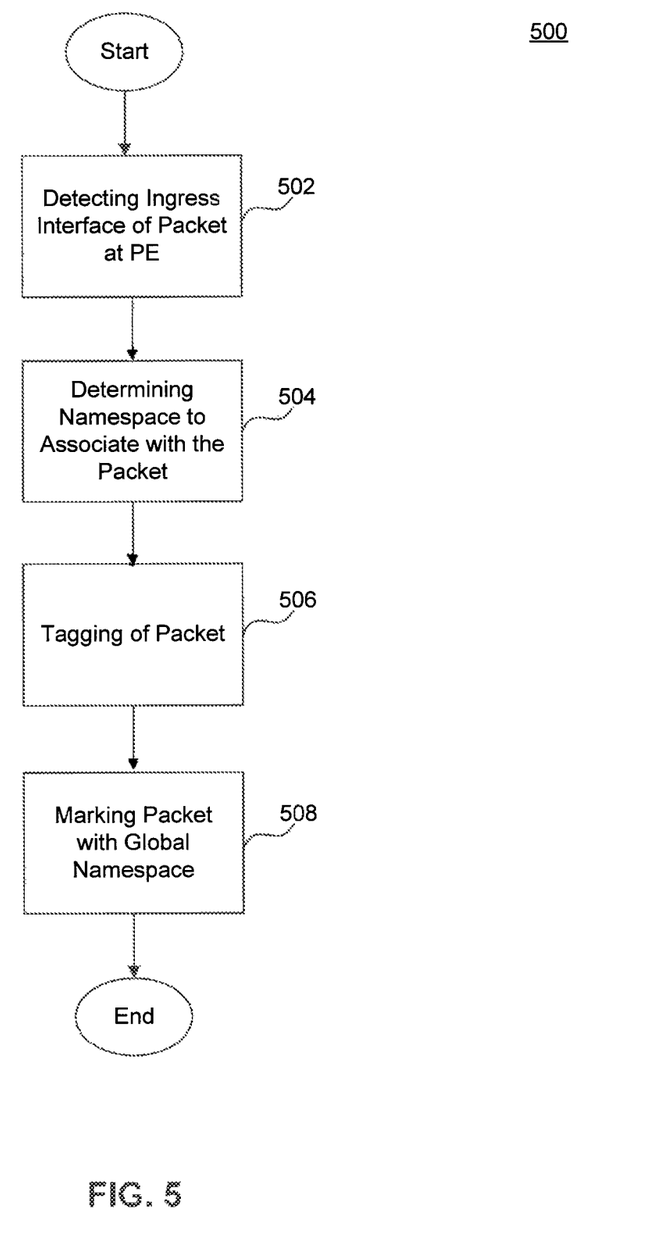
FIG. 5 illustrates a flowchart of a method to mark an incoming packet.

FIG. 5 illustrates a flowchart of a method 500 (steps 502-508) to mark a packet to indicate an associated namespace, according to an embodiment. Method 500 may be used in performing step 410 described above.

Method 500 can be performed when a packet enters an extended switch through a PE. For example, method 500 can be initiated in PE 114 when a packet enters through interface 129. In step 502, the interface through which the packet entered the PE is determined. In many embodiments, a packet receive module, such as packet transmit/receive module 218, receives the incoming packet into the PE. The packet receive logic may make available the information regarding the interface through which the packet entered the PE. For example, packet transmit/receive module 218 can provide a pointer to a data structure corresponding to the packet's ingress interface, such as interface 129 of PE 114.

In step 504, the namespace to be associated with the source PE interface of the packet is determined. The namespace to be associated with the packet can be based upon the ingress interface (i.e., interface through which the packet entered the extended switch). For example, a configuration setting may be available for each PE interface, such as PE interface 129, which specifies whether the interface is associated with a global namespace. If no specific configuration is provided, the packet can be associated with an interface-specific namespace. If a configuration entry is available which specifies that the interface is associated with the global namespace, then the source PE interface of the packet is associated with the global namespace.

In step 506, an E-tag is inserted in the packet for use within the extended switch. The inserting of the E-tag may be performed as described above in relation to step 408.

In step 508, the packet is marked with the namespace associated with the PE interface through which it entered the extended switch. For example, if interface 129 of PE 114 is the interface through which the packet entered extended switch 104, and interface 129 has been configured to be associated with a global namespace, then the value of a namespace field in the E-tag is set to indicate that the source PE of the packet is associated with the global namespace. According to an embodiment, a one-bit wide field in the E-tag is updated to indicate the namespace. In other embodiments, the namespace field may be located elsewhere in a header portion of the packet and may be of any width, provided the PE and the CB are configured to recognize such a field. In another embodiment, as described above, the namespace association of the source PE interface is conveyed via addresses in the source field and/or the destination field of the E-tag. Marking is further described above in relation to step 410.

Figure 6:
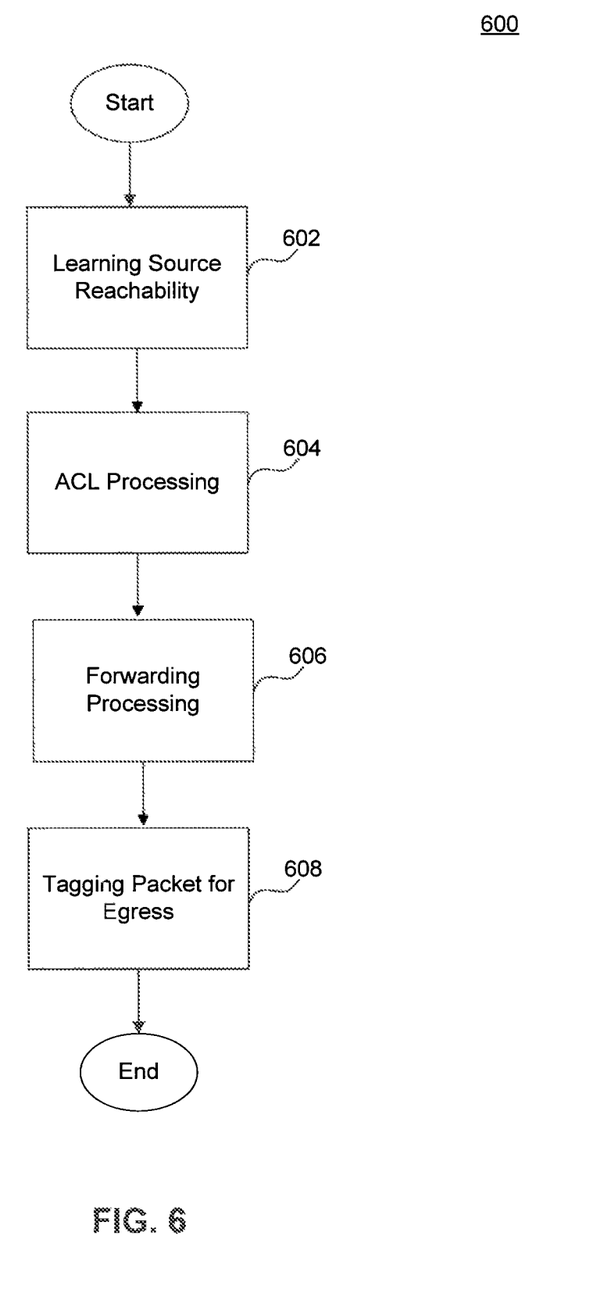
FIG. 6 illustrates a flowchart of a method of processing a packet in the controlling bridge.

The processing of the packet in the CB may differ based on whether the source is associated with an interface-specific namespace or the global namespace. FIG. 6 illustrates a method 600 (steps 602-608) for processing a packet in the CB in accordance with an embodiment. Method 600 can be used in performing step 412 described above.

In step 602, the packet can be used in learning source reachability. The CB may, based on the source address of the packet and/or based upon the E-tag's source field and E-tag's destination field, learn that the source and/or the interface(s) indicated by E-tag's source field are reachable through the interface through which it entered the CB. The learned reachability information may be incorporated into the ACL and forwarding tables. If the source field is indicated to be associated with an interface-specific namespace, then learned reachability information for a node may be verified to ensure that the node is reachable only through one of the CB interfaces. Learning is described above in relation to learning module 328 shown in FIG. 3.

In step 604, ACL processing may be performed. ACL processing may be performed on the incoming packet at any stage before forwarding processing. ACL processing can also be performed on the outgoing packet after the forwarding processing has occurred. ACL processing may be used in implementing policies. According to an embodiment, ACL rules may be configured separately for global namespaces and for interface-specific namespaces. ACL processing is described above in relation to ACL module 330 shown in FIG. 3.

In step 606, forwarding processing may be performed. Forwarding processing determines the next hop for a packet and also determines the PE interface through which the packet should exit the extended switch.

In step 608, a new E-tag is attached or the incoming E-tag is modified before the packet is transmitted out of the CB. If the forwarding process indicates that the packet is to be transmitted out of the uplink interface (e.g., to L2 cloud 108) then the E-tag is removed before the packet is sent out of that interface. If the packet is to be forwarded through the PEs, then the E-tag is updated based on the forwarding lookup. The tagging of the outgoing packet is described above in relation to step 414 and step 506 above.

Figure 7:
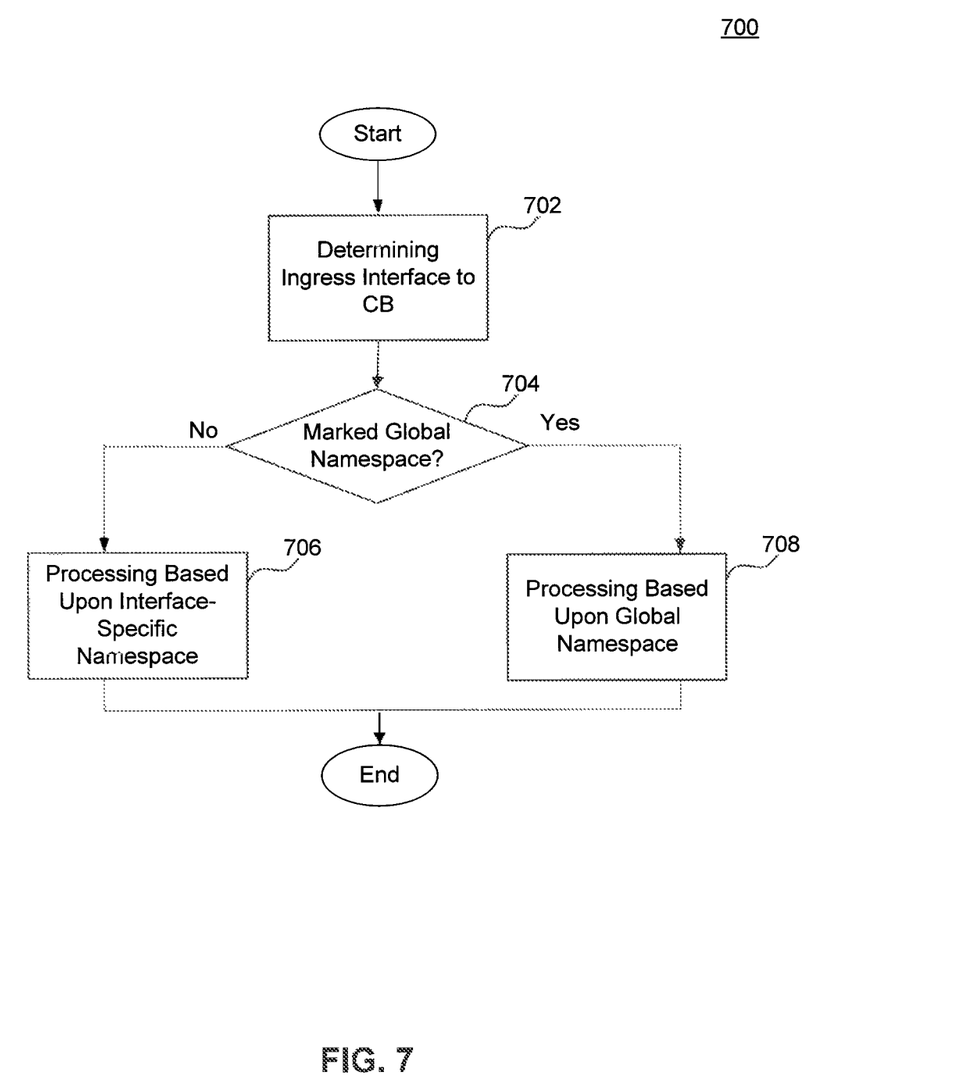
FIG. 7 illustrates a flowchart of a method for determining the processing to be applied at the controlling bridge.

FIG. 7 illustrates a method 700 (steps 702-708) for processing a packet, according to an embodiment of the present disclosure. Method 700 can be used in performing step 412 described above. Specifically, method 700 can be used to determine the namespace associated with the source of the packet at the CB and to initiate processing, such as the processing described with respect to method 600 above.

In step 702, the interface through which the packet entered the CB is determined. The interface through which the packet entered the CB can be determined based upon the E-tag's destination field of the incoming packet.

In step 704, it is determined if the source is associated with the global namespace or an interface-specific namespace. The determination of the associated namespace can be based upon the optional namespace field of the incoming packet. In another embodiment, the namespace determination may be based upon the value of the E-tag's destination field as described above.

If it is determined that the source PE interface of the packet is associated with an interface-specific namespace, then in step 706, the packet is processed based upon the interface-specific namespace. Otherwise (i.e., if it is determined that the source PE interface of the packet is associated with the global namespace), in step 708, the packet is processed according to the global namespace.

Figure 8:
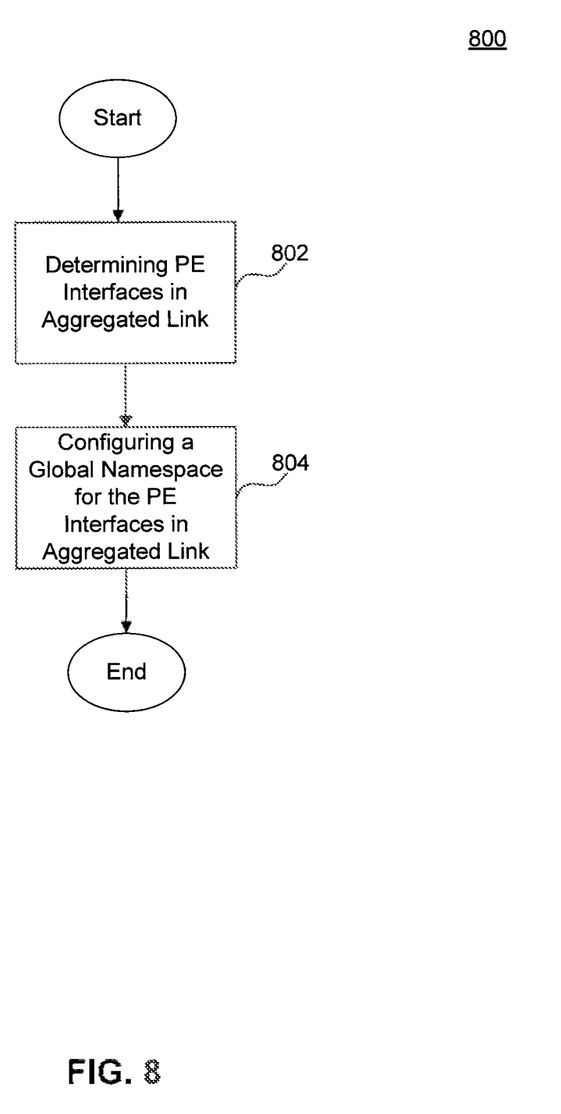
FIG. 8 illustrates a flowchart of a method configuring an interface.

FIG. 8 illustrates a flowchart of a method 800 (steps 802-804) for associating PE interfaces with the global namespace, according to an embodiment. For example, method 800 may be used in performing step 404 described above.

In step 802, PE interfaces that belong to aggregation groups are identified. According to an embodiment, PE interfaces that are directly connected to an external device and have links that are part of a LAG are identified. The LAG is, typically, a configuration at the external device.

In step 804, two or more interface that are identified in step 802 are configured as being associated with the global namespace. The configuration may be performed by setting a value in a configuration parameters associated with each interface. According to an embodiment, if an interface is not specifically configured as associated with the global namespace, then it may be considered as associated with an interface-specific namespace by default.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for forwarding a packet through a distributed switch, the distributed switch including a first port extender and a second port extender directly or indirectly communicatively coupled to respectively a first interface and a second interface of a controlling bridge, the method comprising:

associating a first port extender interface of the first port extender with a global namespace or an interface-specific namespace;

receiving a packet through the first port extender interface;

marking the received packet with an address and an indication of the namespace associated with the first port extender interface;

processing the address of the marked packet in the controlling bridge based at least in part upon the indication of the namespace associated with the first port extender interface; and transmitting the processed packet out of the controlling bridge.

2. The method of claim 1, wherein the processing comprises:

indicating, in the packet, an outgoing port extender interface for the packet to exit the distributed switch; and indicating, in the packet, a namespace associated with the outgoing port extender interface.

3. The method of claim 1, wherein the associating comprises setting a namespace configuration of the first port extender interface and a second port extender interface of the second port extender to the global namespace, wherein the first port extender interface and the second port extender interface are communicatively coupled to respective interfaces of a link aggregation group (LAG) between the controlling bridge and at least one edge server.

4. The method of claim 1, wherein the marking comprises:

detecting that the packet entered the first port extender through the first port extender interface;

determining a namespace indication for the detected packet based upon the namespace associated with the first port extender interface; and marking the packet with the determined namespace indication.

5. The method of claim 4, wherein determining the namespace indication includes selecting between the global namespace and an interface-specific namespace.

6. The method of claim 1, wherein the processing comprises:

selecting between an interface-specific namespace and the global namespace based upon the indication; and looking up a forwarding table in the controlling bridge for a destination address, wherein the destination address is specified in the packet.

7. The method of claim 6, wherein the looking up the forwarding table comprises:

detecting a plurality of forwarding entries in the forwarding table matching the destination address; and selecting one of the forwarding entries based upon the indication.

8. The method of claim 1, further comprising:

attaching a local header to the received packet at the first port extender, wherein the local header comprises a source field and a destination field; and configuring the source field with the address, the address identifying a source of the packet, wherein the address is also associated with the first interface and the first port extender interface.

9. The method of claim 8, further comprising:

changing, after the processing of the packet, the source field and the destination field based upon respective namespace configurations of the first port extender interface and an outgoing port extender interface through which the packet is to exit the distributed switch.

10. The method of claim 9, wherein the changing includes:

setting the source field with an updated address associated with the first interface and a destination address included in the destination field of the packet.

11. The method of claim 8, wherein the marking comprises selecting the address for the source field based upon the global namespace.

12. The method of claim 8, wherein the local header further comprises at least one namespace indicator field, and wherein the marking comprises configuring the at least one namespace indicator field to indicate the global namespace.

13. The method of claim 1, wherein the processing comprises:

learning reachability to a source of the packet, wherein the learning is performed based upon the indication.

14. The method of claim 13, wherein the learning includes source pruning.

15. The method of claim 1, wherein the processing comprises:

determining, based upon a first information of the packet, that the packet entered the controlling bridge through the first interface;

determining, based upon a second information of the packet, that the packet entered the first port extender through the first port extender interface, wherein the second information was inserted into the packet in the first port extender; and determining if the packet includes the indication of the global namespace.

16. The method of claim 15, wherein the processing further comprises:

if the indication for the global namespace is included in the packet, looking up at least one of a forwarding entry or an access control entry based upon the global namespace.

17. A system for forwarding a packet, comprising:

a controlling bridge;

a first port extender directly or indirectly coupled to a first interface of the controlling bridge;

a second port extender directly or indirectly coupled to a second interface of the controlling bridge;

an interface configuration module configured to associate a first port extender interface of the first port extender with a global namespace or an interface-specific namespace;

a packet receiving module configured to receive a packet through the first port extender interface;

a packet namespace marking module configured to mark the packet with an address and an indication of the namespace associated with the first port extender interface; and a packet processing module configured to process the address of the marked packet in the controlling bridge based at least in part upon the indication of the namespace associated with the first port extender interface.

18. The system of claim 17, wherein the interface configuration module is further configured to set a namespace configuration of the first port extender interface and a second port extender interface of the second port extender to the global namespace, wherein the first port extender interface and the second port extender interface are communicatively coupled to respective interfaces of a link aggregation group (LAG) between the controlling bridge and at least one edge server.

19. The system of claim 17, wherein the packet namespace marking module is further configured to:

attach a local header to the received packet at the first port extender, wherein the local header comprises a source field and a destination field;

configure the source field with the address, the address identifying the source of the packet, wherein the address is associated with the first interface and the first port extender interface; and wherein the packet processing module is further configured to change, after the processing of the packet, the source field and the destination field based upon respective namespace configurations of the first port extender interface and an outgoing port extender interface.

20. The system of claim 19, wherein the packet namespace marking module is further configured to select the address for the source field based upon the global namespace.

21. The system of claim 19, wherein the local header further comprises at least one namespace indicator field, and wherein the packet namespace marking module further configures the at least one namespace indicator field to indicate the global namespace.

22. A computer readable storage medium storing instructions wherein said instructions, when executed by a processor, are adapted to perform packet forwarding through a distributed switch wherein the distributed switch includes a first port extender and a second port extender directly or indirectly communicatively coupled to respectively a first interface and a second interface of a controlling bridge, the packet forwarding performed with a method comprising:

associating a first port extender interface of the first port extender with a global namespace or an interface-specific namespace;

receiving a packet through the first port extender interface;

marking the received packet with an address and an indication of the namespace associated with the first port extender interface;

processing the address of the marked packet in the controlling bridge based at least in part upon the indication of the namespace associated with the first port extender interface; and transmitting the processed packet out of the controlling bridge.

23. The computer readable storage medium of claim 22, wherein the method further comprises:

attaching a local header to the received packet at the first port extender, wherein the local header comprises a source field and a destination field; and configuring the source field with the address, the address identifying a source of the packet, wherein the address is associated with the first interface and the first port extender interface.

* * * * *